(12) United States Patent
Homma et al.

(10) Patent No.: US 8,980,360 B2
(45) Date of Patent: *Mar. 17, 2015

(54) FAT AND/OR OIL COMPOSITION

(75) Inventors: Rika Homma, Utsunomiya (JP);
Kazuichi Tomonobu, Chiba (JP)

(73) Assignee: Kao Corporation, Tokyo (JP)

( * ) Notice: Subject to any disclaimer, the term of this patent is extended or adjusted under 35 U.S.C. 154(b) by 22 days.

This patent is subject to a terminal disclaimer.

(21) Appl. No.: 13/996,904

(22) PCT Filed: Dec. 20, 2011

(86) PCT No.: PCT/JP2011/079438
§ 371 (c)(1),
(2), (4) Date: Jun. 21, 2013

(87) PCT Pub. No.: WO2012/086620
PCT Pub. Date: Jun. 28, 2012

(65) Prior Publication Data
US 2013/0280407 A1  Oct. 24, 2013

(30) Foreign Application Priority Data
Dec. 21, 2010  (JP) ................................. 2010-284438
Nov. 30, 2011  (JP) ................................. 2011-261957

(51) Int. Cl.
A23D 9/007  (2006.01)
A23D 9/00   (2006.01)
A23L 1/01   (2006.01)

(52) U.S. Cl.
CPC ........... *A23D 9/007* (2013.01); *A23D 9/00* (2013.01); *A23L 1/0107* (2013.01)
USPC ........................................................ 426/601

(58) Field of Classification Search
None
See application file for complete search history.

(56) References Cited

U.S. PATENT DOCUMENTS

| | | | |
|---|---|---|---|
| 5,514,398 A * | 5/1996 | Imai et al. ...................... 426/271 |
| 5,869,708 A * | 2/1999 | Das et al. ........................ 552/510 |
| 6,197,357 B1 * | 3/2001 | Lawton et al. .............. 426/330.6 |
| 6,277,431 B1 | 8/2001 | Berry et al. |
| 7,288,278 B2 * | 10/2007 | Mellerup et al. ............... 426/606 |
| 8,048,335 B2 * | 11/2011 | Tanabe ........................ 252/299.7 |
| 2001/0046548 A1 | 11/2001 | Berry et al. |
| 2002/0192318 A1 | 12/2002 | Berry et al. |
| 2008/0069932 A1 | 3/2008 | Kohori et al. |
| 2011/0177226 A1 | 7/2011 | Nii et al. |
| 2012/0259133 A1 | 10/2012 | Homma et al. |
| 2013/0023684 A1 | 1/2013 | Moriwaki et al. |
| 2013/0230630 A1 * | 9/2013 | Homma et al. ................ 426/541 |

FOREIGN PATENT DOCUMENTS

| | | |
|---|---|---|
| CN | 1479578 A | 3/2004 |
| CN | 1949983 A | 4/2007 |
| JP | 4 78264 | 12/1992 |
| JP | 2001 224309 | 8/2001 |
| JP | 2001 226693 | 8/2001 |
| JP | 2003 55687 | 2/2003 |
| JP | 2004 519228 | 7/2004 |
| JP | 2006 257064 | 9/2006 |
| JP | 2008 61577 | 3/2008 |
| WO | 2005 104865 | 11/2005 |

OTHER PUBLICATIONS

Itoh, T. et al 1973. JAOCS 50:300.*
Itoh, T. et al 1973. JAOCS 50:122.*
Kuroda, N. et al. 1977. Cereal Chemistry 54:997.*
"Arteriosclerosis", vol. 13, No. 2, pp. 273 to 279, (Jun. 1985) (with English translation).
International Search Report Issued Feb. 28, 2012 in PCT/JP11/79438 Filed Dec. 20, 2011.
U.S. Appl. No. 13/988,170, filed May 17, 2013, Homma, et al.
U.S. Appl. No. 14/240,214, filed Feb. 21, 2014, Homma, et al.
U.S. Appl. No. 14/347,888, filed Mar. 27, 2014, Homma, et al.
U.S. Appl. No. 14/347,915, filed Mar. 27, 2014, Homma, et al.
U.S. Appl. No. 14/240,295, filed Feb. 21, 2014, Homma, et al.
U.S. Appl. No. 14/240,206, filed Feb. 21, 2014, Homma, et al.
U.S. Appl. No. 14/240,248, filed Feb. 21, 2014, Homma, et al.
U.S. Appl. No. 14/240,209, filed Feb. 21, 2014, Homma et al.

* cited by examiner

*Primary Examiner* — Carolyn Paden
(74) *Attorney, Agent, or Firm* — Oblon, McClelland, Maier & Neustadt, L.L.P.

(57) ABSTRACT

Provided is a fat or oil composition, comprising: (A) from 0.02 to 1.8 mass % of a free type triterpene alcohol; and (B) 1.4 mass % or less of a fatty acid ester type triterpene alcohol, in which a mass ratio of the component (A) to the component (B) ((A)/(B)) is larger than 1.

20 Claims, No Drawings

FAT AND/OR OIL COMPOSITION

FIELD OF THE INVENTION

The present invention relates to a fat or oil composition useful in cooking.

BACKGROUND OF THE INVENTION

Heretofore, liquid fats or oils such as corn oil, rapeseed oil, soybean oil, cottonseed oil, rice oil, safflower oil, sunflower oil, high-oleic safflower oil, high-oleic sunflower oil, sesame oil, and olive oil have been mainly used as fats or oils for cooking. The fats or oils for cooking are required to have properties such as low-temperature stability and an ability to avoid reducing the taste and flavor of a food.

Meanwhile, a triterpene alcohol is a tetracyclic compound having 30 or 31 carbon atoms and is a component widely distributed in plants such as rice bran, wheat, sesame, soybean, cocoa, coconut, corn seeds, olive seeds, and aloe. Further, the triterpene alcohol is a major component of an alcohol part constituting γ-oryzanol. A variety of reports have been made on physiological functions of the triterpene alcohol and the like, and the triterpene alcohol is known to have a blood cholesterol-reducing effect and a lipid absorption-suppressing effect and the like (for example, Non Patent Document 1 and Patent Document 1).

Based on recent health trends, an attempt to impart the physiological functions of the triterpene alcohol and the like to edible oils has been made, and there have been reported, for example, an edible fat or oil which includes oryzanol, a free type or fatty acid ester type phytosterol, and a free type or fatty acid ester type triterpene alcohol and has a blood lipid-mitigating function (Patent Document 2), and an edible oil which includes a tocopherol, a tocotrienol, a free type sterol, a sterol ester, a cycloartenol, and a saturated fat and can reduce the synthesis, absorption, and blood level of cholesterol and increase excretion of cholesterol (Patent Document 3).

CITATION LIST

Patent Document

[Patent Document 1] JP-A-2006-257064
[Patent Document 2] JP-A-2001-224309
[Patent Document 3] JP-A-2004-519228

Non Patent Document

[Non Patent Document 1] Arteriosclerosis Vol. 13, No. 2 June (1985) 273-278

SUMMARY OF THE INVENTION

The present invention provides a fat or oil composition, comprising: (A) from 0.02 to 1.8 mass % of a free type triterpene alcohol; and (B) 1.4 mass % or less of a fatty acid ester type triterpene alcohol, in which a mass ratio of the component (A) to the component (B) ((A)/(B)) is larger than 1.

SUMMARY OF THE INVENTION

Until now, many studies have been made on a technology for improving properties of a fat or oil for cooking, but further improvement of the taste and flavor of a cooked food has been required. In addition, if unpleasant taste such as bitterness of a material and unpleasant odor can be suppressed by cooking, the material can be used widely.

Therefore, the present invention relates to providing a fat or oil composition which can be used in cooking and can improve properties of a cooked food, such as the taste and flavor.

The inventors of the present invention have made intensive studies in search of a fat or oil for cooking, which can impart excellent properties. As a result, they found that a cooked food having a good taste and flavor while having a bitterness specific to a material suppressed can be obtained by cooking a material using a fat or oil composition containing a triterpene alcohol.

However, it found that a turbidity may be caused depending on a preservation state. In addition, for example, when the composition is used for a deep-fried food, it may be difficult to feel original taste and flavor of a material. In addition, when the composition is used for a sauteed food, the food may have a bad texture. Therefore, the inventors of the present invention have made further intensive studies to solve the problems. As a result, they found that a fat or oil composition which can keep its transparency even at low temperature and has good appearance, original good taste and flavor of a material, improved texture, and good properties as a fat or oil for cooking can be obtained by adjusting the content of a triterpene alcohol in a fat or oil composition to a certain range and adjusting the ratio of a free type triterpene alcohol to be larger than that of a fatty acid ester type triterpene alcohol. Further, the inventors found that the composition can suppress a raw smell specific to a material.

According to the present invention, it is possible to obtain a fat or oil composition which is excellent in low-temperature resistance, can reduce the bitterness and raw smell of a material, which may be avoided by consumers, and can produce a delicious cooked food excellent in the texture and taste and flavor.

DETAILED DESCRIPTION OF THE INVENTION

The triterpene alcohol used in the present invention is a tetracyclic triterpene alcohol having 30 or 31 carbon atoms. The triterpene alcohol is a compound clearly different from a 4-desmethylsterol having 28 or 29 carbon atoms, such as β-sitosterol, stigmasterol, or campesterol.

The triterpene alcohol can be obtained by, for example, extraction from rice (rice bran), rice oil (rice bran oil), or a fat or oil containing the triterpene alcohol other than rice oil, or a fat or oil-processed product, or by hydrolysis of γ-oryzanol. Further, a commercially available product may be used, and examples of the product include Oryza Triterpenoid-P (Oryza Oil & Fat Chemical Co., Ltd.).

The triterpene alcohols are classified into a free type triterpene alcohol (A) and a fatty acid ester type triterpene alcohol (B). The term "free type" refers to a triterpene alcohol having a hydroxyl group at C-3 position of a steroid nucleus, and the term "fatty acid ester type" refers to a triterpene alcohol having a fatty acid which is ester bonded to the hydroxyl group at C-3 position of the free type triterpene alcohol. Examples of the free type triterpene alcohol (A) include cycloartenol, 24-methylenecycloartanol, cyclobranol, cycloartanol, cyclosadol, cyclolaudenol, butyrospermol, and parkeol and the like. The free type triterpene alcohols may each be used as a single compound, or may be used as a mixture. Of those, from the standpoints of physiological effects, one or two or more selected from cycloartenol, 24-methylenecycloartanol, and cyclobranol are preferred, and cycloartenol, 24-methylenecycloartanol, or a combination thereof is more preferred.

In addition, the fatty acid forming an ester with the free type triterpene alcohol is not particularly limited, and there is given a linear or branched and saturated or unsaturated fatty acid. Examples thereof include acetic acid, propionic acid, butyric acid, valeric acid, caproic acid, enanthic acid, caprylic acid, pelargonic acid, capric acid, undecanoic acid, lauric acid, myristic acid, palmitic acid, zoomaric acid, stearic acid, oleic acid, elaidic acid, linoleic acid, linolenic acid, arachidonic acid, gadoleic acid, arachic acid, behenic acid, erucic acid, eicosapentaenoic acid, and docosahexaenoic acid and the like. The fatty acid ester type triterpene alcohols may each be used as a single compound, or may be used as a mixture. Of those, from the standpoints of physiological effects, preferred is one or two or more selected from a fatty acid ester of cycloartenol, a fatty acid ester of 24-methylenecycloartanol, a fatty acid ester of cyclobranol, a fatty acid ester of cycloartanol, a fatty acid ester of cyclosadol, a fattyacidester of cyclolaudenol, a fattyacid ester of butyrospermol, and a fatty acid ester of parkeol, more preferred is one or two or more selected from a fatty acid ester of cycloartenol, a fatty acid ester of 24-methylenecycloartanol, and a fatty acid ester of cyclobranol, and even more preferred is a fatty acid ester of cycloartenol, a fatty acid ester of 24-methylenecycloartanol, or a combination thereof.

Further, as the fatty acid ester type triterpene alcohol, more preferred is one or two or more selected from oleic acid ester of cycloartenol, linoleic acid ester of cycloartenol, α-linolenic acid ester of cycloartenol, stearic acid ester of cycloartenol, palmitic acid ester of cycloartenol, oleic acid ester of 24-methylenecycloartanol, linoleic acid ester of 24-methylenecycloartanol, α-linolenic acid ester of 24-methylenecycloartanol, palmitic acid ester of 24-methylenecycloartanol, and stearic acid ester of 24-methylenecycloartanol, and even more preferred is one or two or more selected from linoleic acid ester of cycloartenol, α-linolenic acid ester of cycloartenol, oleic acid ester of 24-methylenecycloartanol, linoleic acid ester of 24-methylenecycloartanol, α-linolenic acid ester of 24-methylenecycloartanol, and palmitic acid ester of 24-methylenecycloartanol.

The fat or oil composition of the present invention contains from 0.02 to 1.8 mass % (hereinafter simply referred to as "%") of the free type triterpene alcohol (A). When the content of the component (A) is adjusted to 0.02% or more, the bitterness of a material, which may be avoided by consumers, can be reduced. The content of the free type triterpene alcohol is preferably 0.05% or more, more preferably 0.1% or more, more preferably 0.15% or more, more preferably 0.2% or more, more preferably 0.3% or more, more preferably 0.4% or more, even more preferably 0.5% or more, from the standpoint of reducing the bitterness of a material and the standpoints of physiological effects. On the other hand, when the content of the free type triterpene alcohol is adjusted to 1.8% or less, white turbidity of the fat or oil at low temperature can be suppressed. Therefore, the content of the free type triterpene alcohol is preferably 1.6% or less, more preferably 1.55% or less, more preferably 1.5% or less, more preferably 1% or less, even more preferably 0.75% or less, from the standpoint of suppressing white turbidity of the fat or oil at low temperature.

In addition, the content of the free type triterpene alcohol in the fat or oil composition is preferably from 0.05 to 1.6%, more preferably from 0.15 to 1.55%, more preferably from 0.3 to 1.5%, more preferably from 0.4 to 1%, even more preferably from 0.5 to 0.75%, from the standpoint of reducing the bitterness and the standpoint of cool tolerance.

The content of cycloartenol in the free type triterpene alcohol is preferably from 15 to 100%, more preferably from 20 to 90%, even more preferably from 25 to 80%, from the standpoints of reducing the bitterness, and the standpoints of cool tolerance and physiological effects.

The content of cycloartenol in the fat or oil composition is preferably from 0.003 to 1.8%, more preferably from 0.004 to 1.62%, more preferably from 0.005 to 1.44%, more preferably from 0.0075 to 1.4%, more preferably from 0.01 to 1.35%, more preferably from 0.015 to 0.9%, even more preferably from 0.03 to 0.68%, from the same viewpoints.

Further, the content of 24-methylenecycloartanol in the free type triterpene alcohol is preferably from 5 to 85%, more preferably from 10 to 80%, even more preferably from 20 to 75%, from the standpoint of industrial production.

The content of 24-methylenecycloartanol in the fat or oil composition is preferably from 0.001% to 1.53%, more preferably from 0.002% to 1.44%, even more preferably from 0.004 to 1.35%, from the same standpoint.

The content of the fatty acid ester type triterpene alcohol (B) in the fat or oil composition of the present invention is 1.4% or less. In the case where the fat or oil composition comprising 1.4% or less of the component (B) is used for cooking, it is possible to make use of good original taste and flavor of a material, to improve the texture, and to reduce the bitterness. The content of the fatty acid ester type triterpene alcohol is preferably 1.2% or less, more preferably 1% or less, more preferably 0.75% or less, more preferably 0.5% or less, more preferably 0.4% or less, even more preferably 0.3% or less, from the standpoints of improving the taste and flavor, improving the texture, and suppressing the bitterness. The content of the fatty acid ester type triterpene alcohol is preferably 0.01% or more, more preferably 0.05% or more, more preferably 0.1% or more, even more preferably 0.2% or more, from the standpoints of suppressing the raw smell specific to the material, and the standpoints of physiological effects.

Further, the content of the fatty acid ester type triterpene alcohol in the fat or oil composition is preferably from 0.01 to 1.4%, more preferably from 0.01 to 0.5%, more preferably from 0.05 to 0.5%, more preferably from 0.1 to 0.5%, even more preferably from 0.2 to 0.4%, from the standpoints of improving the taste and flavor, improving the texture, suppressing the bitterness, and suppressing the raw smell of meat, and the standpoints of physiological effects.

The content of the fatty acid ester of cycloartenol in the fatty acid ester type triterpene alcohol is preferably from 15 to 100%, more preferably from 20 to 90%, even more preferably from 25 to 80%, from the standpoints of improving the taste and flavor, improving the texture, suppressing the bitterness, and suppressing the raw smell of meat, and the standpoints of physiological effects.

The content of the fatty acid ester of cycloartenol in the fat or oil composition is preferably from 0.0015 to 1.4%, more preferably from 0.002 to 1.26%, even more preferably from 0.0025 to 1.12%, from the same standpoints.

In addition, the content of the fatty acid ester of 24-methylenecycloartanol in the fatty acid ester type triterpene alcohol is preferably from 5 to 85%, more preferably from 10 to 80%, even more preferably from 20 to 75%, from the standpoint of industrial production.

The content of the fatty acid ester of 24-methylenecycloartanol in the fat or oil composition is preferably from 0.0005 to 1.19%, more preferably from 0.001 to 1.12%, even more preferably from 0.002 to 1.05%, from the same standpoint.

In the fat or oil composition of the present invention, the content of the free type triterpene alcohol (A) is larger than the content of the fatty acid ester type triterpene alcohol (B).

That is, the mass ratio of the free type triterpene alcohol (A) to the fatty acid ester type triterpene alcohol (B) ((A)/(B)) is larger than 1. The mass ratio (A)/(B) is preferably 1.2 or more, more preferably 1.2 or more and 20 or less, even more preferably 1.25 or more and 10 or less, from the standpoint of improving the taste and flavor, the stand point of cool tolerance, and the stand point of suppressing the bitterness.

Further, in the fat or oil composition of the present invention, the content of γ-oryzanol is preferably 0.7% or less, more preferably 0.5% or less, more preferably 0.1% or less, more preferably 0.05% or less, even more preferably 0.01% or less, from the standpoint of suppressing oily feeling. The content of γ-oryzanol is preferably from 0 to 0.5%, more preferably from 0.0002 to 0.15%, more preferably from 0.0002 to 0.1%, more preferably from 0.001 to 0.1%, even more preferably from 0.001 to 0.05%, from the standpoints of improving the taste and flavor and suppressing oily feeling, and from the viewpoint of production.

The term "γ-oryzanol" as used herein is a collective term for a ferulic acid (3-methoxy-4-hydroxycinnamic acid) ester of a plant-derived sterol, and the γ-oryzanol is a substance present in rice oil, corn oil, or another cereal bran oil. Here, examples of the plant-derived sterol include the triterpene alcohols and plant-derived sterols except the triterpene alcohols, such as α-sitosterol, β-sitosterol, stigmasterol, campesterol, α-sitostanol, β-sitostanol, stigmastanol, campestanol, brassicasterol, fucosterol, isofucosterol, spinasterol, and avenasterol. The γ-oryzanols may each be used as a single compound, or may be used as a mixture.

It is preferable to contain one or two or more selected from cycloartenol ferulic acid ester, 24-methylenecycloartanol ferulic acid ester, cyclobranol ferulic acid ester, cyclosadol ferulic acid ester, β-sitosterol ferulic acid ester, stigmasterol ferulic acid ester, and campesterol ferulic acid ester as the γ-oryzanol.

An edible fat or oil that may be used in the fat or oil composition of the present invention is not particularly limited, and examples thereof may include the following fats or oils: plant-derived fats or oils such as soybean oil, rapeseed oil, safflower oil, rice oil, corn oil, palm oil, sunflower oil, cotton seed oil, olive oil, sesame oil, peanut oil, Job's tears seed oil, wheat germ oil, Japanese basil oil, linseed oil, perilla oil, sacha inchi oil, walnut oil, kiwi seed oil, salvia seed oil, grape seed oil, macadamia nut oil, hazelnut oil, pumpkin seed oil, camellia oil, tea seed oil, borage oil, palm oil, palm olein, palm stearin, coconut oil, palm kernel oil, cacao fat, sal fat, shea fat, and algae oil; animal-derived fats or oils such as fish oil, lard, beef tallow, and butter fat; and transesterified oils, hydrogenated oils, and fractionated oils thereof. The oils may be used singly or may be mixed appropriately before use. Of those, from the standpoint of usability, a plant-derived fat or oil is preferably used, and a liquid fat or oil excellent in low-temperature resistance is more preferably used. The liquid fat or oil means a fat or oil that stays liquid at 20° C., when determined in accordance with a cold test described in Standard Methods for Analysis of Fats and Oils 2.3.8-27. In addition, the edible fat or oil is preferably a refined fat or oil obtained by a refinement step. The composition of fatty acids in the fat or oil is by no means limited, but the fat or oil preferably contains a functional fatty acid such as a highly-unsaturated fatty acid such as linoleic acid, α-linolenic acid, γ-linolenic acid, stearidonic acid, EPA, or DHA.

The content of the fat or oil in the fat or oil composition of the present invention is preferably from 95 to 99.95%, more preferably from 97 to 99%, from the standpoint of usability.

The fat or oil composition of the present invention contains any one or more of a monoacylglycerol, a diacylglycerol, and a triacylglycerol, and the content of the diacylglycerol in the fat or oil composition is preferably 9% or less, more preferably from 0.1 to 7%, even more preferably from 0.2 to 5%, from the standpoint of industrial productivity of the fat or oil. Further, the content of the monoacylglycerol is preferably 3% or less, more preferably from 0 to 2%, from the standpoint of improving the taste and flavor. The content of the triacylglycerol is preferably from 88 to 100%, more preferably from 90 to 99.5%, even more preferably from 92 to 99%, from the standpoint of the industrial productivity of the fat or oil.

In addition, the content of the free fatty acid (salt) in the fat or oil composition in the present invention is preferably 5% or less, more preferably from 0 to 2%, even more preferably from 0 to 1%, from the standpoints of the taste and flavor and the industrial productivity of the fat or oil.

The constituent fatty acids of the fat or oil in the fat or oil composition of the present invention are not particularly limited and may include a saturated fatty acid or an unsaturated fatty acid. The proportion of the unsaturated fatty acid is preferably from 60 to 100%, more preferably from 70 to 100%, more preferably from 75 to 100%, even more preferably 80 to 98%, from the standpoints of the appearance and the industrial productivity of the fat or oil. The carbon number of the unsaturated fatty acid is preferably from 14 to 24, more preferably from 16 to 22, from the standpoints of physiological effects.

In addition, the content of the saturated fatty acid of the constituent fatty acids of the fat or oil in the fat or oil composition is preferably 40% or less, more preferably from 0 to 30%, more preferably from 0 to 25%, even more preferably from 2 to 20%, from the standpoints of the appearance, the physiological effects, and the industrial productivity of the fat or oil. The carbon number of the saturated fatty acid is preferably from 14 to 24, more preferably from 16 to 22.

In addition, the content of an antioxidant in the fat or oil composition of the present invention is preferably from 0.01 to 2%, more preferably from 0.01 to 1%, even more preferably from 0.01 to 0.5%, from the standpoint of oxidative stability at the time of each of preservation and cooking. The antioxidant includes preferably one or two or more selected from, for example, a natural antioxidant, tocopherol, ascorbyl palmitate, ascorbyl stearate, dibutylhydroxytoluene (BHT), and butylhydroxyanisol (BHA), more preferably, for example, one or two or more selected from a natural antioxidant, tocopherol, and ascorbyl palmitate. Of those, ascorbyl palmitate and tocopherol are preferably used in combination.

The fat or oil composition of the present invention can be used in the same manner as a general edible fat or oil, and can be applied to a wide range of foods and beverages including the fat or oil. In particular, the fat or oil composition of the present invention is used preferably as a fat or oil for cooking, more preferably as a fat or oil for cooking of, for example, a deep-fried food such as fry or tempura, a sauteed food, or a grilled food.

In addition, as shown in Examples below, the free type triterpene alcohol is considered to have a suppressing effect on a vegetable's bitterness because the vegetable's bitterness was suppressed by adding the free type triterpene alcohol to the fat or oil composition. Therefore, the free type triterpene alcohol is useful as a suppressor for the vegetable's bitterness and can be used for suppressing the vegetable's bitterness. Examples of the vegetable having a bitterness include solanaceous vegetables such as bell peppers and shishito peppers, and alliaceous vegetables such as Japanese leek.

In addition, as shown in Examples below, the fatty acid ester type triterpene alcohol is considered to have a suppressing effect on a raw smell of meat because the raw smell of meat was suppressed by adding the fatty acid ester type triterpene alcohol to the fat or oil composition. Therefore, the fatty acid ester type triterpene alcohol is useful as a suppressor for the raw smell of meat, and can be used for suppressing the raw smell of meat.

Preferred embodiments of the present invention are as described below.

<1> A fat or oil composition comprising: (A) from 0.02 to 1.8% of a free type triterpene alcohol; and (B) 1.4% or less of a fatty acid ester type triterpene alcohol, in which the mass ratio of the component (A) to the component (B) ((A)/(B)) is larger than 1.

<2> The fat or oil composition according to the above-mentioned item <1>, in which the content of the free type triterpene alcohol (A) is preferably 0.05% or more, more preferably 0.1% or more, more preferably 0.15% or more, more preferably 0.2% or more, more preferably 0.3% or more, more preferably 0.4% or more, even more preferably 0.5% or more.

<3> The fat or oil composition according to the above-mentioned item <1> or <2>, in which the content of the free type triterpene alcohol (A) is preferably 1.6% or less, more preferably 1.55% or less, more preferably 1.5% or less, more preferably 1% or less, even more preferably 0.75% or less.

<4> The fat or oil composition according to the above-mentioned item <1>, in which the content of the free type triterpene alcohol (A) is preferably from 0.05 to 1.6%, more preferably from 0.15 to 1.55%, more preferably from 0.3 to 1.5%, more preferably 0.4% to 1%, even more preferably from 0.5 to 0.75%.

<5> The fat or oil composition according to any one of the above-mentioned items <1> to <4>, in which the free type triterpene alcohol (A) is one or two or more selected from cycloartenol, 24-methylenecycloartanol, cyclobranol, cycloartanol, cyclosadol, cyclolaudenol, butyrospermol, and parkeol, preferably one or two or more selected from cycloartenol, 24-methylenecycloartanol, and cyclobranol, even more preferably cycloartenol, 24-methylenecycloartanol, or a combination thereof.

<6> The fat or oil composition according to the above-mentioned item <5>, in which the content of cycloartenol in the free type triterpene alcohol (A) is preferably from 15 to 100%, more preferably from 20 to 90%, even more preferably from 25 to 80%.

<7> The fat or oil composition according to the above-mentioned item <5> or <6>, in which the content of cycloartenol in the fat or oil composition is preferably from 0.003 to 1.8%, more preferably from 0.004 to 1.62%, more preferably from 0.005 to 1.44%, more preferably from 0.0075 to 1.4%, more preferably from 0.01 to 1.35%, more preferably from 0.015 to 0.9%, even more preferably from 0.03 to 0.68%.

<8> The fat or oil composition according to any one of the above-mentioned items <5> to <7>, in which the content of 24-methylenecycloartanol in the free type triterpene alcohol (A) is preferably from 5 to 85%, more preferably from 10 to 80%, even more preferably from 20 to 75%.

<9> The fat or oil composition according to any one of the above-mentioned items <5> to <8>, in which the content of 24-methylenecycloartanol in the fat or oil composition is preferably from 0.001% to 1.53%, more preferably from 0.002% to 1.44%, even more preferably from 0.004 to 1.35%.

<10> The fat or oil composition according to any one of the above-mentioned items <1> to <9>, in which the content of the fatty acid ester type triterpene alcohol (B) is preferably 1.2% or less, more preferably 1% or less, more preferably 0.75% or less, more preferably 0.5% or less, more preferably 0.4% or less, even more preferably 0.3% or less.

<11> The fat or oil composition according to any one of the above-mentioned items <1> to <10>, in which the content of the fatty acid ester type triterpene alcohol (B) is preferably 0.01% or more, more preferably 0.05% or more, more preferably 0.1% or more, even more preferably 0.2% or more.

<12> The fat or oil composition according to any one of the above-mentioned items <1> to <9>, in which the content of the fatty acid ester type triterpene alcohol (B) is preferably from 0.01% to 1.4%, more preferably from 0.01% to 0.5%, more preferably from 0.05% to 0.5%, more preferably from 0.1% to 0.5%, even more preferably from 0.2% to 0.4%.

<13> The fat or oil composition according to any one of the above-mentioned items <1> to <12>, in which the fatty acid ester type triterpene alcohol (B) is one or two or more selected from a fatty acid ester of cycloartenol, a fatty acid ester of 24-methylenecycloartanol, a fatty acid ester of cyclobranol, a fatty acid ester of cycloartanol, a fatty acid ester of cyclosadol, a fatty acid ester of cyclolaudenol, a fatty acid ester of butyrospermol, and a fatty acid ester of parkeol, preferably one or two or more selected from a fatty acid ester of cycloartenol, a fatty acid ester of 24-methylenecycloartanol, and a fatty acid ester of cyclobranol, even more preferably a fatty acid ester of cycloartenol, a fatty acid ester of 24-methylenecycloartanol, or a combination thereof.

<14> The fat or oil composition according to the above-mentioned item <13>, in which the content of the fatty acid ester of cycloartenol in the fatty acid ester type triterpene alcohol (B) is preferably from 15 to 100%, more preferably from 20 to 90%, even more preferably from 25 to 80%.

<15> The fat or oil composition according to the above-mentioned item <13> or <14>, in which the content of the fatty acid ester of cycloartenol in the fat or oil composition is preferably from 0.0015 to 1.4%, more preferably from 0.002 to 1.26%, even more preferably from 0.0025 to 1.12%.

<16> The fat or oil composition according to any one of the above-mentioned items <13> to <15>, in which the content of the fatty acid ester of 24-methylenecycloartanol in the fatty acid ester type triterpene alcohol (B) is preferably from 5 to 85%, more preferably from 10 to 80%, even more preferably from 20 to 75%.

<17> The fat or oil composition according to any one of the above-mentioned items <13> to <16>, in which the content of the fatty acid ester of 24-methylenecycloartanol in the fat or oil composition is preferably from 0.0005% to 1.19%, more preferably from 0.001% to 1.12%, even more preferably from 0.002 to 1.05%.

<18> The fat or oil composition according to any one of the above-mentioned items <1> to <17>, in which the mass ratio of the free type triterpene alcohol (A) to the fatty acid ester type triterpene alcohol (B) ((A)/(B)) is preferably 1.2 or more, more preferably 1.2 or more and 20 or less, even more preferably 1.25 or more and 10 or less.

<19> The fat or oil composition according to any one of the above-mentioned items <1> to <18>, in which the content of γ-oryzanol is preferably 0.7% or less, more preferably 0.5% or less, more preferably 0.1% or less, more preferably 0.05% or less, even more preferably 0.01% or less.

<20> The fat or oil composition according to any one of the above-mentioned items <1> to <18>, in which the content of γ-oryzanol is preferably from 0 to 0.5%, more preferably from 0.0002 to 0.15%, more preferably from 0.0002 to 0.1%, more preferably from 0.001 to 0.1%, even more preferably from 0.001 to 0.05%.

<21> The fat or oil composition according to any one of the above-mentioned items <1> to <20>, comprising preferably from 95 to 99.95%, more preferably from 97 to 99% of a fat or oil.

<22> The fat or oil composition according to any one of the above-mentioned items <1> to <21>, in which the content of a triacylglycerol is preferably from 88 to 100%, more preferably from 90 to 99.5%, even more preferably from 92 to 99%.
<23> The fat or oil composition according to any one of the above-mentioned items <1> to <22>, in which preferably from 60 to 100%, more preferably from 70 to 100%, more preferably from 75 to 100%, even more preferably from 80 to 98% of constituent fatty acids of the fat or oil are unsaturated fatty acids.
<24> The fat or oil composition according to any one of the above-mentioned items <1> to <23>, further comprising preferably from 0.01 to 2%, more preferably from 0.01 to 1%, even more preferably from 0.01 to 0.5% of an antioxidant.
<25> The fat or oil composition according to the above-mentioned item <24>, in which the antioxidant is one or two or more selected from a natural antioxidant, tocopherol, ascorbyl palmitate, ascorbyl stearate, dibutylhydroxytoluene, and butylhydroxyanisol, preferably one or two or more selected from a natural antioxidant, tocopherol, and ascorbyl palmitate, even more preferably a combination of tocopherol and ascorbyl palmitate.
<26> Use of the fat or oil composition according to any one of the above-mentioned items <1> to <25> as an edible fat or oil.
<27> The use according to the above-mentioned item <26> as a fat or oil for cooking.
<28> The use according to the above-mentioned item <26> as a fat or oil for cooking of a deep-fried food, a sauteed food, or a grilled food.
<29> Use of a fatty acid ester type triterpene alcohol for suppressing a raw smell of meat.
<30> The use according to the above-mentioned item <29>, in which the fatty acid ester type triterpene alcohol is one or two or more selected from a fatty acid ester of cycloartenol, a fatty acid ester of 24-methylenecycloartanol, a fatty acid ester of cyclobranol, a fatty acid ester of cycloartanol, a fatty acid ester of cyclosadol, a fatty acid ester of cyclolaudenol, a fatty acid ester of butyrospermol, and a fatty acid ester of parkeol, preferably one or two or more selected from a fatty acid ester of cycloartenol, a fatty acid ester of 24-methylenecycloartanol, and a fatty acid ester of cyclobranol, more preferably a fatty acid ester of cycloartenol, a fatty acid ester of 24-methylenecycloartanol, or a combination thereof.
<31> The use according to the above-mentioned item <29> or <30>, in which the content of the fatty acid ester of cycloartenol in the fatty acid ester type triterpene alcohol is preferably from 15 to 100%, more preferably from 20 to 90%, even more preferably from 25 to 80%.

EXAMPLES

Analysis Method (i) Composition of Glycerides in Fat or Oil

About 10 mg of a fat or oil sample and 0.5 mL of a trimethylsilylating agent ("Silylating agent TH," manufactured by Kanto Kagaku) were placed in a glass sample bottle, and the bottle was sealed and heated at 70° C. for 15 minutes. 1.0 mL of water and 1.5 mL of hexane were added thereto, and the bottle was shaken. The bottle was allowed to stand still, and then the upper layer was analyzed by gas-liquid chromatography (GLC).
<GLC Analysis Conditions>
Column: DB-1ht, 10.0 m×0.25 mm×0.10 μm (Agilent)
Injector: 340° C., split ratio: 50:1
Detector: 350° C. (FID)
Carrier gas: helium, 1 mL/min
Oven temperature: 80° C.→(10° C./min)→340° C. (kept for 20 minutes)

(ii) Composition of Constituent Fatty Acids in Fat or Oil

Fatty acid methyl esters were prepared in accordance with "Preparation method for fatty acid methyl ester (2.4.1.-1996)" described in "Standard Method For Analysis of Fats and Oils" edited by Japan Oil Chemists' Society, and the resultant samples were subjected to measurement according to American Oil Chemists. Society Official Method Ce 1f-96 (GLC method).
<GLC Analysis Conditions>
Column: CP-SIL88, 100 m×0.25 mm×0.2 μm (VARIAN)
Injector: 250° C., split ratio: 200:1
Detector: 250° C. (FID)
Carrier gas: helium, 1 mL/min
Oven temperature: 174° C. (kept for 50 minutes)→(5° C./min)→220° C. (kept for 25 minutes)

(iii) Total Triterpene Alcohols

About 5 g of a fat or oil sample and about 20 mL of a 2 N potassium hydroxide/ethanol solution were added to a conical flask, and the mixture was heated at 80° C. for 60 minutes. The mixture was left standing to cool to room temperature, and then an internal standard (cholesterol), 15 mL of water, and 10 mL of hexane were added thereto, followed by shaking. The mixture was allowed to stand still, and then the upper layer was separated and concentrated. 0.5 mL of a trimethylsilylating agent ("Silylating agent TH," manufactured by Kanto Kagaku) was added to the concentrate, and the bottle was sealed and heated at 70° C. for 30 minutes. 1.0 mL of water and 1.5 mL of hexane were added thereto, and the bottle was shaken. The bottle was allowed to stand still, and then the total amount of triterpene alcohols (mass %) was measured by analyzing the upper layer by gas-liquid chromatography (GLC).
<GLC Analysis Conditions>
Column: DB-1ht, 10.0 m×0.25 mm×0.10 μm (Agilent)
Injector: 340° C., split ratio: 80:1
Detector: 350° C. (FID)
Carrier gas: helium, 1 mL/min
Oven temperature: 200° C.→(10° C./min)→340° C. (kept for 10 minutes)

(iv) Free Type Triterpene Alcohol

About 500 mg of the fat or oil sample were dissolved in about 5 mL of hexane, and the solution was charged in an SPE cartridge (Sep-Pak Silica, 5 g, GL Sciences Inc.). The cartridge was washed with about 40 mL of hexane/ether (volume ratio 95/5), and then elution was carried out with about 40 mL of ethanol/ether/hexane (volume ratio 50/25/25), followed by separation of an ethanol/ether/hexane elution fraction. The solvent in the resultant fraction was distilled off, and the residue was charged in PTLC (Si60, 20×20×0.1 cm, Merck & Co., Inc.). Development was carried out successively with hexane/ether/acetic acid (volume ratio 90/10/2) and chloroform/ether (volume ratio 95/5), and then a free type triterpene alcohol part was separated. The separated free type triterpene alcohol fraction and 0.5 mL of a trimethylsilylating agent ("Silylating agent TH," manufactured by Kanto Kagaku) were added to a bottle, and the bottle was sealed and heated at 70° C. for 30 minutes. 1.0 mL of water and 1.5 mL of hexane were added thereto, and the mixture was shaken. The mixture was allowed to stand still, and then the amount of a free type triterpene alcohol (mass %) was measured by analyzing the upper layer by gas-liquid chromatography (GLC). The GLC analysis was carried out under the same conditions as those in (iii).

(v) γ-Oryzanol

About 100 mg of a fat or oil sample were dissolved in ethyl acetate to adjust a volume thereof to 10 mL, and analyzed by an HPLC method.

<HPLC Analysis Conditions>

Column: Inertsil ODS-3, 4.6 mm×250 mm, 5 μm (GL Sciences Inc.)
Column temperature: 40° C.
Flow rate: 1.2 mL/min
Detection: UV 325 nm
Eluent: acetonitrile/butanol/acetic acid (volume ratio: 82/3/2)

(vi) Fatty Acid Ester Type Triterpene Alcohol

The amount of the free type triterpene alcohol and the amount of the γ-oryzanol converted into a free type were subtracted from the total amount of triterpene alcohols. Thus, the amount of a fatty acid ester type triterpene alcohol converted into a free type was calculated. The amount of the free type was converted into the amount of fatty acid ester type to determine the amount of the fatty acid ester type triterpene alcohol (mass %). It should be noted that the conversion of the free type into the fatty acid ester type was carried out by calculation on the assumption that the linked fatty acid was oleic acid.

(vii) 4-Desmethylsterol

In the same manner as in (iv) Free type triterpene alcohol, a 4-desmethylsterol part was separated from the fat or oil sample and analyzed by gas-liquid chromatography (GLC).

Examples 1 to 28 and Comparative Examples 1 to 12

Preparation of Fat or Oil Composition

A commercially available triterpene alcohol preparation ("ORYZA TRITERPENOID P" from Oryza Oil & Fat Chemical Co., Ltd., triterpene alcohol: 59%) was used as a free type triterpene alcohol. The component composition of this product is as follows: campesterol: 21%, β-sitosterol: 15%, stigmasterol: 3%, cycloartenol: 22%, and 24-methylenecycloartanol: 370.

A commercially available fatty acid ester of triterpene alcohol ("RICETEROL ESTERS" from TSUNO CO., LTD., triterpene alcohol ester: 31%) was purified and used as a fatty acid ester type triterpene alcohol. The component composition of this product is as follows: cycloartenol ester: 12%, 24-methylenecycloartanol ester: 12%, cyclobranol ester: 7%, campesterol ester: 14%, β-sitosterol ester: 15%, and stigmasterol ester: 4%.

A commercially available plant-derived sterol preparation ("Phytosterol S" from Tama Biochemical Co., Ltd., phytosterol: 97%) was used as a plant-derived sterol (4-desmethylsterol). The component composition of this product is as follows: brassicasterol: 5%, campesterol: 25%, stigmasterol: 21%, and β-sitosterol: 46%.

The respective components were blended in refined rapeseed oil (manufactured by The Nisshin OilliO Group, Ltd.), and were dissolved by mixing until the mixtures turned entirely clear using a stirrer while the temperature was kept to 50° C. Thus, each fat or oil composition was prepared. The contents of the free type triterpene alcohol, the fatty acid ester type triterpene alcohol, and 4-desmethylsterol in the fat or oil compositions are as shown in Table 2 or 3.

It should be noted that the composition of glycerides and composition of fatty acids in the refined rapeseed oil were as shown in Table 1. In addition, the contents of the free type triterpene alcohol and the fatty acid ester type triterpene alcohol, and the content of the γ-oryzanol in the refined rapeseed oil were found to be 0%.

TABLE 1

|  | Refined rapeseed oil |
|---|---|
| Composition of glyceride (mass %) | |
| MAG | 0.0 |
| DAG | 0.9 |
| TAG | 99.1 |
| Fatty acid | 0.0 |
| Composition of fatty acid (mass %) | |
| C14:0 | 0.0 |
| C16:0 | 4.3 |
| C16:1 | 0.2 |
| C18:0 | 2.0 |
| C18:1 | 60.5 |
| C18:2 | 21.0 |
| C18:3 | 10.8 |
| C20:0 | 0.6 |
| C20:1 | 0.4 |
| C22:0 | 0.0 |
| C24:0 | 0.1 |

(Tempura Cooking)

Tempura cooking was performed with each of the fat or oil compositions by the following method.
Oil amount: 600 g (wok)
Oil temperature: 180° C., heating with a gas stove burner (medium heat)

| Materials to be fried | |
|---|---|
| Prawn (black tiger prawns) | 8 prawns |
| Lotus root (slices) | 8 slices |
| Pumpkin (slices) | 8 slices |
| Bell peppers (each cut into halves) | 8 peppers |
| Shishito peppers (whole) | 8 peppers |
| f. viridis (Makino) Makino (whole) | 8 pieces |
| Eggplants (each cut into halves) | 8 eggplants |
| Batter: | |
| Flour | 100 g |
| Egg | 50 g |
| Water | 150 g |

(Evaluation of Cool Tolerance)

Nine panelists evaluated the appearance of each sample which had been preserved at 5° C. for 1 day in accordance with the following evaluation standards, and an average value of scores was calculated as a score of cool tolerance. Tables 2 and 3 show the results.

(Cool Tolerance)
  5: Very good
  4: Good
  3: Just about good but having slight turbidity
  2: Rather bad and having a little turbidity
  1: Bad and having white turbidity (Evaluation of taste and flavor)

Nine panelists evaluated the taste and flavor of deep-fried foods in accordance with the following evaluation standards, and an average value of scores was calculated as a score of the tempura. It should be noted that cooked bell pepper and shishito pepper were evaluated for bitterness. Tables 2 and 3 show the results.

(Bitterness)
  5: Having no bitterness
  4: Having much reduced bitterness
  3: Having reduced bitterness
  2: Having slightly reduced bitterness
  1: Having bitterness (Entire Taste and Flavor)
5: Having taste and flavor of material
4: Having considerable taste and flavor of material
3: Having slight taste and flavor of material
2: Having little taste and flavor of material
1: Having no taste and flavor of material

TABLE 2

|  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Blend | (A) Free type triterpene alcohol (mass %) | 0.02 | 0.20 | 0.10 | 0.30 | 0.50 | 0.20 | 0.40 | 0.60 | 0.75 | 1.00 |
|  | (B) Fatty acid ester type triterpene alcohol (mass %) | 0.01 | 0.01 | 0.05 | 0.05 | 0.05 | 0.10 | 0.10 | 0.10 | 0.10 | 0.10 |
|  | (A)/(B) | 2.00 | 20.00 | 2.00 | 6.00 | 10.00 | 2.00 | 4.00 | 6.00 | 7.50 | 10.00 |
| Evaluation | (1) Cool tolerance | 5 | 5 | 5 | 5 | 5 | 5 | 5 | 5 | 5 | 4 |
|  | (2) Bitterness | 3 | 3 | 3 | 4 | 5 | 3 | 4 | 5 | 5 | 5 |
|  | (3) Entire taste and flavor | 5 | 5 | 5 | 5 | 5 | 5 | 5 | 5 | 5 | 5 |

|  |  | Example 11 | Example 12 | Example 13 | Example 14 | Example 15 | Example 16 | Example 17 | Example 18 | Example 19 | Example 20 |
|---|---|---|---|---|---|---|---|---|---|---|---|
| Blend | (A) Free type triterpene alcohol (mass %) | 1.50 | 0.30 | 0.50 | 0.40 | 0.60 | 0.75 | 1.00 | 1.50 | 0.50 | 0.60 |
|  | (B) Fatty acid ester type triterpene alcohol (mass %) | 0.10 | 0.20 | 0.20 | 0.30 | 0.30 | 0.30 | 0.30 | 0.30 | 0.40 | 0.40 |
|  | (A)/(B) | 15.00 | 1.50 | 2.50 | 1.33 | 2.00 | 2.50 | 3.33 | 5.00 | 1.25 | 1.50 |
| Evaluation | (1) Cool tolerance | 4 | 5 | 5 | 5 | 5 | 4 | 4 | 4 | 5 | 5 |
|  | (2) Bitterness | 5 | 4 | 5 | 4 | 5 | 5 | 5 | 5 | 5 | 5 |
|  | (3) Entire taste and flavor | 5 | 5 | 5 | 5 | 5 | 5 | 5 | 5 | 5 | 5 |

|  |  | Example 21 | Example 22 | Example 23 | Example 24 | Example 25 | Example 26 | Example 27 | Example 28 |
|---|---|---|---|---|---|---|---|---|---|
| Blend | (A) Free type triterpene alcohol (mass %) | 0.60 | 0.75 | 1.00 | 1.50 | 1.00 | 1.50 | 1.50 | 1.80 |
|  | (B) Fatty acid ester type triterpene alcohol (mass %) | 0.50 | 0.50 | 0.50 | 0.50 | 0.75 | 0.75 | 1.00 | 1.20 |
|  | (A)/(B) | 1.20 | 1.50 | 2.00 | 3.00 | 1.33 | 2.00 | 1.50 | 1.50 |
| Evaluation | (1) Cool tolerance | 4 | 4 | 4 | 4 | 4 | 3 | 3 | 3 |
|  | (2) Bitterness | 5 | 5 | 5 | 5 | 5 | 5 | 5 | 5 |
|  | (3) Entire taste and flavor | 4 | 4 | 4 | 4 | 4 | 4 | 3 | 3 |

TABLE 3

|  |  | Comparative Example 1 | Comparative Example 2 | Comparative Example 3 | Comparative Example 4 | Comparative Example 5 | Comparative Example 6 |
|---|---|---|---|---|---|---|---|
| Blend | (A) Free type triterpene alcohol (mass %) | 0.00 | 0.00 | 2.00 | 0.20 | 0.10 | 0.30 |
|  | (B) Fatty acid ester type triterpene alcohol (mass %) | 0.00 | 0.10 | 0.10 | 0.30 | 0.50 | 0.50 |
|  | 4-Desmethylsterol (mass %) | 0.00 | 0.00 | 0.00 | 0.00 | 0.00 | 0.00 |
|  | (A)/(B) | — | 0.00 | 20.00 | 0.67 | 0.20 | 0.60 |

TABLE 3-continued

| Evaluation | | | | | | | |
|---|---|---|---|---|---|---|---|
| | (1) Cool tolerance | 5 | 5 | 2 | 4 | 4 | 4 |
| | (2) Bitterness | 1 | 1 | 5 | 2 | 2 | 3 |
| | (3) Entire taste and flavor | 5 | 4 | 3 | 2 | 2 | 2 |

| | | Comparative Example 7 | Comparative Example 8 | Comparative Example 9 | Comparative Example 10 | Comparative Example 11 | Comparative Example 12 |
|---|---|---|---|---|---|---|---|
| Blend | (A) Free type triterpene alcohol (mass %) | 2.00 | 0.50 | 1.00 | 2.00 | 2.00 | 0.00 |
| | (B) Fatty acid ester type triterpene alcohol (mass %) | 0.50 | 1.00 | 1.50 | 1.50 | 2.00 | 0.05 |
| | 4-Desmethylsterol (mass %) | 0.00 | 0.00 | 0.00 | 0.00 | 0.00 | 0.50 |
| | (A)/(B) | 4.00 | 0.50 | 0.67 | 1.33 | 1.00 | 0.00 |
| Evaluation | (1) Cool tolerance | 2 | 4 | 2 | 2 | 2 | 5 |
| | (2) Bitterness | 5 | 4 | 4 | 4 | 3 | 1 |
| | (3) Entire taste and flavor | 3 | 2 | 1 | 1 | 1 | 5 |

As is clear from the results shown in Table 2, the fat or oil compositions comprising the free type triterpene alcohol in specific amounts and the fatty acid ester type triterpene alcohol in specific amounts were found to have excellent low-temperature resistance. In addition, the deep-fried foods cooked using the fat or oil compositions were found to have good original taste and flavor of the materials, reduced bitterness, which may be avoided by consumers, and good properties in the taste and flavor.

Meanwhile, the fats or oils comprising the free type triterpene alcohol in large amounts were inferior in the cool tolerance (Comparative Examples 3 and 7), and in particular, the fats or oils comprising not only the free type triterpene alcohol but also the fatty acid ester type triterpene alcohol in large amounts caused white turbidity when preserved at low temperature (Comparative Examples 9 to 11).

In addition, the deep-fried food cooked using the fat or oil comprising the refined rapeseed oil (Comparative Example 1) or the free type triterpene alcohol in a small amount (Comparative Example 2) was found to have original bitterness of the materials, and the deep-fried food cooked using the fat or oil comprising 4-desmethylsterol (Comparative Example 12) was also found to have original bitterness of the materials. Further, when the fats or oils comprising the fatty acid ester type triterpene alcohol in large amounts were used, the taste and flavor of the materials was masked, thereby reducing the original good taste and flavor of the materials (Comparative Examples 8 to 11). In addition, when the ratio of the fatty acid ester type triterpene alcohol to the free type triterpene alcohol became larger, suppression of the bitterness was reduced, thereby reducing the original good taste and flavor of the materials (Comparative Examples 4 to 6, 8, and 9).

Examples 29 to 34 and Comparative Example 13

Fried rice was made with each of the fats or oils, prepared above and shown in Table 4, by the following method.

9 g of the fat or oil composition were put into an iron frying pan (diameter: 24 cm) and heated over a medium heat, and Japanese leek (10 g) and egg (40 g) were fried. Then, cold rice (300 g) was fried and seasoned with salt (1 g) and soy sauce (2.5 mL). Nine panelists evaluated the taste and flavor of the resultant fried rice (the bitterness of Japanese leek) and the texture of rice grains in accordance with the following evaluation standards, and an average value of scores was calculated as a score of the fried rice. Table 4 shows the results.

(Bitterness)
　5: Having no bitterness
　4: Having much reduced bitterness
　3: Having reduced bitterness
　2: Having slightly reduced bitterness
　1: Having bitterness (Texture of Rice Grains)
　5: Easily separated and delicious
　4: Having few aggregates
　3: Having a few aggregates
　2: Having aggregates and being slightly sticky
　1: Having aggregates and being sticky

TABLE 4

| | | Example 29 | Example 30 | Example 31 | Example 32 | Example 33 | Example 34 | Comparative Example 13 |
|---|---|---|---|---|---|---|---|---|
| Blend | (A) Free type triterpene alcohol (mass %) | 0.30 | 0.50 | 1.0 | 0.50 | 0.50 | 1.0 | 0.20 |
| | (B) Fatty acid ester type triterpene alcohol (mass %) | 0.05 | 0.05 | 0.10 | 0.20 | 0.40 | 0.50 | 0.30 |
| | (A)/(B) | 6.00 | 10.00 | 10.00 | 2.50 | 1.25 | 2.00 | 0.67 |
| Evaluation | (1) Bitterness | 4 | 5 | 5 | 5 | 5 | 5 | 2 |
| | (2) Texture of rice grains | 5 | 5 | 4 | 5 | 5 | 4 | 2 |

As is clear from the results shown in Table 4, the fried rice cooked using each of the fat or oil compositions comprising the free type triterpene alcohol in specific amounts and the fatty acid ester type triterpene alcohol in specific amounts was found to have good properties in the taste and flavor and texture.

Meanwhile, in the case of the fat or oil comprising the fatty acid ester type triterpene alcohol in a larger amount than the free type triterpene alcohol (Comparative Example 13), the rice grains became sticky.

Examples 35 to 42 and Comparative Examples 14 to 16

Pork fillet cutlet cooking was performed with each of the fats or oils, prepared above and shown in Table 4, by the following method.
Oil amount: 600 g (wok)
Oil temperature: 180° C., heating with a gas stove burner (medium heat)
Materials to be fried: pork fillet (4 pieces×3 times)
Preparation beforehand: seasoning with salt and pepper, followed by coating with egg, flour, and bread crumbs
(Evaluation of Taste and Flavor)
Nine panelists evaluated the taste and flavor of deep-fried foods in accordance with the following evaluation standards, and an average value of scores was calculated as a score of the deep-fried food. Table 5 shows the results.
(Raw smell of meat)
5: Having no raw smell
4: Having much reduced raw smell
3: Having reduced raw smell
2: Having slightly reduced raw smell
1: Having raw smell
(Entire Taste and Flavor)
5: Having taste and flavor of material
4: Having considerable taste and flavor of material
3: Having slight taste and flavor of material
2: Having little taste and flavor of material
1: Having no taste and flavor of material

The invention claimed is:

1. A fat or oil composition, comprising:
(A) from 0.02 to 1.8 mass % of a free type triterpene alcohol; and
(B) 1.4 mass % or less of a fatty acid ester type triterpene alcohol,
from 88 to 100 mass % of triacylglycerol,
wherein a mass ratio of the component (A) to the component (B) ((A)/(B)) is larger than 1.

2. The fat or oil composition according to claim 1, comprising from 0.05 to 1.6 mass % of the free type triterpene alcohol (A).

3. The fat or oil composition according to claim 1, comprising from 0.15 to 1.55 mass % of the free type triterpene alcohol (A).

4. The fat or oil composition according to claim 1, comprising from 0.3 to 1.5 mass % of the free type triterpene alcohol (A).

5. The fat or oil composition according to claim 1, comprising from 0.5 to 0.75 mass % of the free type triterpene alcohol (A).

6. The fat or oil composition according to claim 1, comprising 1.2% or less of the fatty acid ester type triterpene alcohol (B).

7. The fat or oil composition according to claim 1, comprising 0.5% or less of the fatty acid ester type triterpene alcohol (B).

8. The fat or oil composition according to claim 1, comprising 0.3% or less of the fatty acid ester type triterpene alcohol (B).

9. The fat or oil composition according to claim 1, comprising from 0.01 to 0.5 mass % of the fatty acid ester type triterpene alcohol (B).

10. The fat or oil composition according to claim 1, wherein the mass ratio of the component (A) to the component (B) ((A)/(B)) is from 1.2 to 20.

11. The fat or oil composition according to claim 1, wherein the mass ratio of the component (A) to the component (B) ((A)/(B)) is from 1.25 to 10.

TABLE 5

|  |  | Example 35 | Example 36 | Example 37 | Example 38 | Example 39 | Example 40 | Example 41 | Example 42 | Comparative Example 14 | Comparative Example 15 | Comparative Example 16 |
|---|---|---|---|---|---|---|---|---|---|---|---|---|
| Blend | (A) Free type triterpene alcohol (mass %) | 0.20 | 0.20 | 0.30 | 0.40 | 0.50 | 0.60 | 1.00 | 1.50 | 0.0 | 2.00 | 2.00 |
|  | (B) Fatty acid ester type triterpene alcohol (mass %) | 0.01 | 0.10 | 0.20 | 0.30 | 0.40 | 0.50 | 0.75 | 1.00 | 0.0 | 1.50 | 2.00 |
|  | (A)/(B) | 20.00 | 2.00 | 1.50 | 1.33 | 1.25 | 1.20 | 1.33 | 1.50 | — | 1.33 | 1.00 |
| Evaluation | (1) Raw smell of meat | 3 | 4 | 5 | 5 | 5 | 5 | 5 | 5 | 2 | 5 | 5 |
|  | (2) Entire taste and flavor | 5 | 5 | 5 | 5 | 5 | 4 | 4 | 3 | 5 | 1 | 1 |

As is clear from the results shown in Table 5, the deep-fried foods cooked using the fat or oil compositions comprising the fatty acid ester type triterpene alcohol in specific amounts were found to have good original taste and flavor of the materials, reduced raw smell of meat, which may be avoided by consumers, and good properties in the taste and flavor.

In addition, the deep-fried food obtained using the refined rapeseed oil (Comparative Example 14) was found to have original raw smell of the materials. Further, when the amount of the fatty acid ester type triterpene alcohol became larger, the original taste and flavor of the materials was reduced (Comparative Examples 15 and 16).

12. The fat or oil composition according to claim 1, wherein the free type triterpene alcohol (A) comprises at least one member selected from the group consisting of cycloartenol, 24-methylenecycloartanol, and cyclobranol.

13. The fat or oil composition according to claim 12, wherein the free type triterpene alcohol comprises from 15 to 100 mass % of cycloartenol.

14. The fat or oil composition according to claim 12, comprising from 0.003 to 1.8 mass % of cycloartenol.

15. The fat or oil composition according to claim 12, comprising from 0.001 to 1.53 mass % of 24-methylenecycloartanol.

16. The fat or oil composition according to claim 1, comprising from 90 to 99.5 mass % of triacylglycerol.

17. The fat or oil composition according to claim 1, comprising 9 mass % or less of diacylglycerol.

18. The fat or oil composition according to claim 1, comprising 0.7 mass % or less of γ-oryzanol.

19. The fat or oil composition according to claim 1, comprising from 0 to 0.5 mass % of γ-oryzanol.

20. The fat or oil composition according to claim 1, comprising from 0.001 to 0.05 mass % of γ-oryzanol.

* * * * *